US008554197B2

(12) United States Patent
Rabii

(10) Patent No.: US 8,554,197 B2
(45) Date of Patent: Oct. 8, 2013

(54) SYSTEM AND METHOD TO INTERRUPT A COMPONENT OF A MOBILE COMMUNICATION DEVICE RESPONSIVE TO A MUTE COMMAND

(75) Inventor: Khosro M. Rabii, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 358 days.

(21) Appl. No.: 12/855,334

(22) Filed: Aug. 12, 2010

(65) Prior Publication Data
US 2012/0042107 A1   Feb. 16, 2012

(51) Int. Cl.
*H04B 1/38* (2006.01)
*H04M 1/00* (2006.01)
*G08C 17/00* (2006.01)
*G06F 1/00* (2006.01)

(52) U.S. Cl.
USPC ........ 455/423; 455/574; 455/550.1; 370/311; 713/300

(58) Field of Classification Search
USPC ................. 455/550.1, 73, 509, 574; 348/634; 713/300; 709/207, 227; 370/311, 477
See application file for complete search history.

(56) References Cited

U.S. PATENT DOCUMENTS

| | | | |
|---|---|---|---|
| 4,107,613 A | 8/1978 | Queen et al. | |
| 6,493,326 B1 | 12/2002 | Ramachandran | |
| 8,325,639 B2 * | 12/2012 | Kotera et al. | 370/311 |
| 2001/0046887 A1 * | 11/2001 | Yamaoka | 455/569 |
| 2002/0177474 A1 | 11/2002 | Olivieri | |
| 2003/0182432 A1 * | 9/2003 | Lawson | 709/227 |
| 2004/0185896 A1 * | 9/2004 | Riedl et al. | 455/550.1 |
| 2004/0203960 A1 * | 10/2004 | Nagato et al. | 455/466 |
| 2007/0113109 A1 * | 5/2007 | Kim | 713/300 |
| 2008/0282099 A1 | 11/2008 | Yamaguchi | |
| 2011/0183698 A1 * | 7/2011 | Hoctor et al. | 455/509 |
| 2012/0026403 A1 * | 2/2012 | Maciesowicz et al. | 348/634 |

FOREIGN PATENT DOCUMENTS

| | | |
|---|---|---|
| EP | 1128643 | 8/2001 |
| JP | 2007251733 A | 9/2007 |
| WO | 2009076949 A1 | 6/2009 |

OTHER PUBLICATIONS

International Search Report and Written Opinion—PCT/US2011/047679, International Search Authority—European Patent Office—Nov. 28, 2011.

* cited by examiner

*Primary Examiner* — Nizar Sivji
(74) *Attorney, Agent, or Firm* — Heejong Yoo

(57) ABSTRACT

A system and method to interrupt a component of a mobile communication device based on a mute command and a monitored operating condition is disclosed. In another particular embodiment, the method includes receiving a mute command at a mobile communication device while the mobile communication device is performing audio content processing. The method also includes monitoring an operating condition of the mobile communication device in response to receiving the mute command. The method includes determining whether to interrupt a component used to perform the audio content processing based on the monitored operating condition.

26 Claims, 7 Drawing Sheets

SYSTEM AND METHOD TO INTERRUPT A COMPONENT OF A MOBILE COMMUNICATION DEVICE RESPONSIVE TO A MUTE COMMAND

FIELD

The present disclosure is generally related to interrupting a component of a mobile communication device responsive to a mute command.

DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and internet protocol (IP) telephones, can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can process executable instructions, including software applications, such as a web browser application, that can be used to access the Internet. As such, these wireless telephones can include significant computing capabilities.

Conservation of energy in mobile communication devices leads to extended battery life and extended operation between battery recharging events. With a greater degree of processing of multi-media data, mobile communication devices often consume an increased level of energy, potentially draining battery life at an increased rate. An example of such processing by a mobile communication device is an audio or video decoding process. Such audio or video decoding may be performed on streamed media files. An increasing demand for decoding performance as well as a desire for power conservation leads to a need for improved decoding technology.

SUMMARY

A mobile phone is described that is able to play audio content. In response to activating a mute feature, components of the mobile phone may be turned off or changed to a low power mode based on an operating condition of the mobile phone. For example, components for playing the audio content may be turned off during a mute mode when the battery power level of the mobile phone is low.

In a particular embodiment, a method is disclosed that includes receiving a mute command at a mobile communication device while the mobile communication device is performing audio processing. The method also includes monitoring an operating condition of the mobile communication device in response to receiving the mute command. The method includes determining whether to interrupt a component used to perform the audio processing based on the monitored operating condition.

In another particular embodiment, an apparatus is disclosed that includes a media processing system including at least one processing component. The apparatus also includes a controller that includes a first input to receive a mute command, a second input to receive an operating condition, and an output to provide a control signal to selectively change a power consumption condition of the at least one processing component.

One particular advantage provided by at least one of the disclosed embodiments is that a mobile communication device may reduce power consumption of audio processing components during a mute condition when playback of audio content is not desired. Thus, power may be conserved without impacting the experience of a user.

Other aspects, advantages, and features of the present disclosure will become apparent after review of the entire application, including the following sections: Brief Description of the Drawings, Detailed Description, and the Claims.

DETAILED DESCRIPTION

Figure 1:
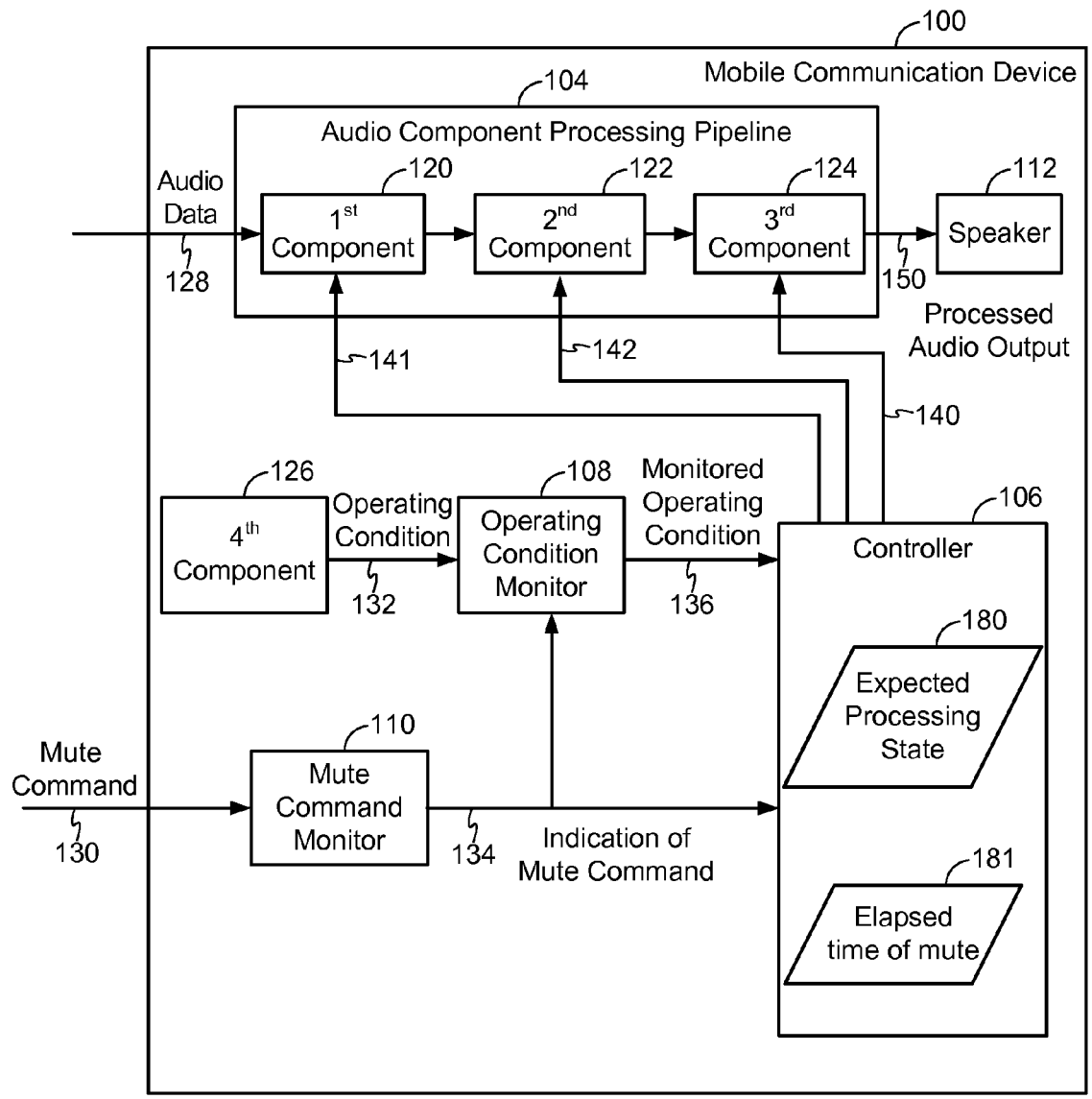
FIG. 1 is a block diagram of a particular illustrative embodiment of a mobile communication device.

Referring to FIG. 1, a particular illustrative embodiment of a mobile communication device 100 is shown. The mobile communication device 100 includes a mute command monitor 110, an operating condition monitor 108, and an audio component processing pipeline 104 that includes a first representative processing component 120, a second representative processing component 122, and a third representative processing component 124. The mobile communication device 100 also includes a fourth representative processing component 126, a speaker 112, and a controller 106. The controller 106 may be configured to determine whether to interrupt one or more of the components 120-124 of the audio component processing pipeline 104 based on a received indication 134 of the mute command 130 and a monitored operating condition 136. Interrupting a component of the audio component processing pipeline 104 during a mute condition may reduce power consumption by components of the mobile communication device 100 during a state that playing of audio content is not desired.

The audio component processing pipeline 104 may be configured to process audio data 128 received at the mobile communication device 100 to generate processed audio output 150 for transmission to the speaker 112. For example, the components 120-124 of the audio component processing pipeline 104 may include data source access circuitry, security/digital rights management (DRM) circuitry, decompression and decoding circuitry, and post-decoding processing circuitry that processes the audio data 128.

Each component of the audio component processing pipeline 104 may be responsive to a control signal from the controller 106. For example, the first audio processing component 120 is responsive to a first control signal 141, the second audio component processing component 122 is responsive to a second control signal 142, and the third audio processing component 124 is responsive to a third control signal 140. In response to receiving an interrupt signal via one of the control signals 140-142, a particular component of the audio component processing pipeline 104 may be configured to reduce power consumption by halting processing of the audio data 128 when a user has muted the processed audio output 150.

A user selection to activate a mute feature may be detected by the mute command monitor 110. For example, the mute command monitor 110 may be configured to detect the mute command 130 received at the mobile communication device 100. The mute command 130 may be a signal generated in response to a user input to the mobile communication device 100. For example, the user may press a button or may touch a location on a touch screen to indicate a desire to mute audio output of the mobile communication device 100. The mute command monitor 110 may be configured to generate and transmit an indication 134 of the mute command 130 to the operating condition monitor 108 and the controller 106.

The operating condition monitor 108 may be responsive to the indication 134 of the mute command 130. The operating condition monitor 108 may be configured to monitor an operating condition 132 of the fourth representative processing component 126. The fourth representative processing component 126 may be a device that registers the operating condition 132 of the mobile communication device 100. For example, the operating condition 132 received by the operating condition monitor 108 may be a data value that indicates a temperature of the mobile communication device 100 when the fourth representative component 126 is a temperature sensor. As another example, the operation condition monitor 108 may receive a data value that indicates a battery power level of the mobile communication device 100 when the fourth representative processing component 126 is a battery power sensor.

In a particular embodiment, the controller 106 is configured to determine whether to interrupt a component of the audio component processing pipeline 104 based on the monitored operating condition 136 and the indication 134 of the mute command 130. In response to determining that a component of the audio component processing pipeline 104 should be interrupted based on the monitored operating condition 136, the controller 106 may transmit a control signal (e.g., one of the control signals 140-142) to a particular component of the audio component processing pipeline 104.

Upon initiating an interrupt of a component of the audio component processing pipeline 104, the controller 106 may be configured to keep track of a processing state of the audio component processing pipeline 104. For example, the controller 106 may determine that the first component 120 is processing a first portion of the audio data 128, the second component 122 is processing a second portion of the audio data 128, and the third component 124 is processing a third portion of the audio data 128. The controller 106 may also be configured to determine an expected processing state 180 of the audio component processing pipeline 104. The expected state 180 may track progress of audio processing as if one or more components had not been interrupted. The controller 106 may also be configured to maintain an elapsed time 181 following the receipt of the indication 134 of the mute command 130. By tracking and storing the expected processing state 180 and the elapsed time 181, the controller 106, upon detecting a de-selection of the mute command 130, can re-engage the audio component processing pipeline 104 such that audio stream processing resumes without delay and without impacting perceived audio playback performance to the user. For example, if the third component 124 is processing a first portion of the audio data 128 when an interrupt is received via the control signal 140, the controller 106 may determine based on the expected processing state 180 and the elapsed time 181 that the third component 124 should process a second portion of the audio data 128 upon reengagement of the audio processing.

During playback of the processed audio data output 150, the mobile communication device 100 may receive the mute command 130, and the indication 134 of the mute command 130 is provided to the controller 106 and to the operating condition monitor 108. The operating condition monitor 108 may monitor the operating condition 132 of the fourth representative processing component 126 and provide the monitored operating condition 136 to the controller 106. Based on the monitored operating condition 136, the controller 106 may determine whether to interrupt one or more components of the audio component processing pipeline 104. For example, when the monitored operating condition 136 indicates that a temperature of the mobile communication device 100 is outside an acceptable operating range, the controller 106 may send an interrupt control signal via at least one of the control signals 140-142 to one or more of the components of the audio component processing pipeline 104. In this case, interrupting a component may include blocking an incoming audio data stream to an audio decoder and powering down the audio decoder.

In a particular embodiment, the mobile communication device 100 may resume operation of components of the audio component processing pipeline 104 in response to a user de-activating a mute condition. The controller 106 may use the expected processing state 180 and the elapsed time 181 to indicate to the components of the audio component processing pipeline 104 which portion of the audio data 128 should be processed. Thus, the mobile communication device 100 may resume playback of the processed audio output 150 without impacting perceived audio playback performance to a user.

By interrupting components of the mobile communication device 100 based on the monitored operating condition 136, the mobile communication device 100 may save power during time periods when a mute feature is activated (i.e. the device is in a mute state). While the mobile communication device 100 is in a mute state, the user has indicated that playback of audio content is not desired. Since eliminating the delivery of the processed audio output 150 via the speaker 112 results in audio data 128 being processed that is not delivered to the user, certain processing components may be shut off while the device is in the mute state. Thus, power to components that process the audio data 128 may be reduced without impacting the playback of audio content during the mute state.

Figure 2:
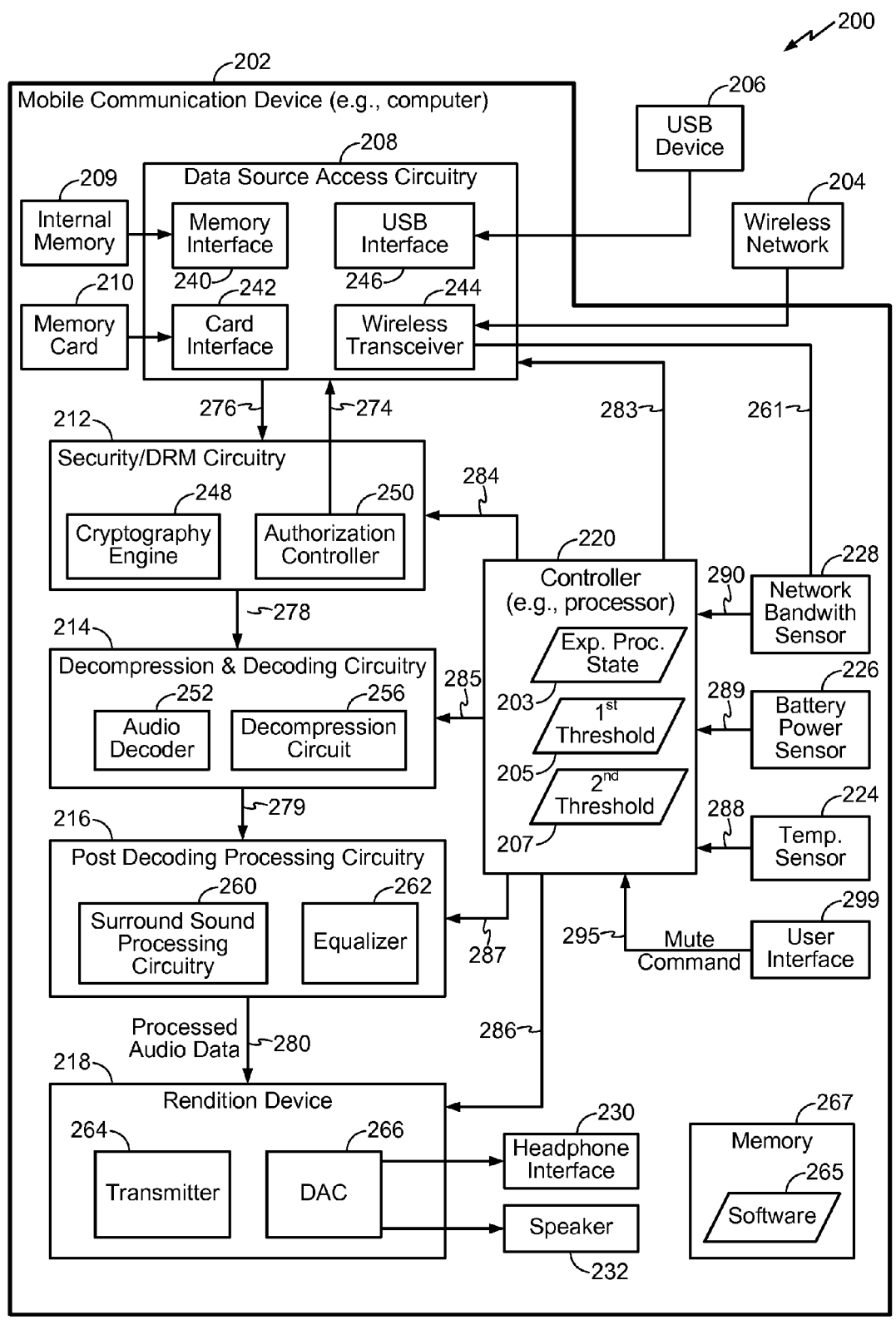
FIG. 2 is a block diagram of a system that includes a mobile communication device.

Referring to FIG. 2, a system 200 that includes a mobile communication device 202 is shown. The mobile communication device 202 includes data source access circuitry 208, security circuitry 212, decompression and decoding circuitry 214, post decoding processing circuitry 216, and a rendition device 218. The mobile communication device 202 also includes a temperature sensor 224, a battery power level sensor 226, and a network bandwidth sensor 228. The mobile communication device 202 further includes a controller 220 that is configured to take action based on a mute command 295 and a monitored operating condition.

The data source access circuitry 208 may be configured to receive audio data from a source and transmit received audio data 276 to other components of the mobile communication device 202 for processing. In a particular embodiment, the data source access circuitry 208 is configured to receive audio data from a source internal to the mobile communication device 202. For example, the data source access circuitry 208 may be configured to receive audio data from an internal memory 209 via a memory interface 240. As another example, audio data may be received by the data source access circuitry 208 from a memory card 210, such as a secure digital (SD) card, via a card interface 242. In a particular embodiment, the data source access circuitry 208 is configured to receive audio data from a source external to the mobile communication device 202. For example, the data source access circuitry 208 may be configured to receive audio data from a wireless network 204 via a wireless transceiver 244. As another example, audio data may be received by the data source access circuitry 208 from a universal serial bus (USB) device 206 via a USB interface 246.

In a particular embodiment, the security circuitry 212 is configured to process the received audio data 276 from the data source access circuitry 208 and to determine whether the mobile communication device 202 is authorized to play the content. For example, an authorization controller 250 may be configured to perform an authorization based on digital rights management (DRM) data included with the received audio data 276. The authorization controller 250 may be configured to transmit an authorization decision 274 to the data source access circuitry 208. The security circuitry 212 may also include a cryptography engine 248 that decrypts the received audio content 276 for transmission to another component of the mobile communication device 202, such as the decompression and decoding circuitry 214.

In a particular embodiment, the decompression and decoding circuitry 214 is configured to decompress and decode decrypted audio data 278 from the security circuitry 212. For example, a decompression circuit 256 may decompress the decrypted audio data 278 and an audio decoder 252 may decode the decrypted audio data 278. The decompression and decoding circuitry 214 may transmit decompressed and decoded audio data 279 to the post decoding processing circuitry 216.

In a particular embodiment, the post decoding processing circuitry 216 is configured to process the decompressed and decoded audio data 279 via one or more processing modules. For example, the post decoding processing circuitry 216 may include surround sound processing circuitry 260 and an equalizer 262. After processing the decoded and decompressed audio data 279, the post decoding processing circuitry 216 may transmit processed audio data 280 to the rendition device 218.

In a particular embodiment, the rendition device 218 may transmit the processed audio data 280 via a digital analog converter (DAC) 266 to a headphone interface 230 or a speaker 232. The rendition device 218 may also include a transmitter 264 for wireless transmission of the processed audio data 280. For example, the transmitter 264 may communicate with wireless headphones or a wireless speaker.

In a particular embodiment, the controller 220 is configured to receive the mute command 295 from a user interface 299. For example, the user interface 299 may include a touch screen or a button to enable a user to select and deselect the mute command 295. In response to receiving the mute command 295, the controller 220 may be configured to monitor an operating condition from a device that registers an operating condition of the mobile communication device 202, such as the temperature sensor 224, the battery power level sensor 226, and the network bandwidth sensor 228. For example, the monitored operating condition 288 from the temperature sensor 224 may be a data value that indicates a temperature of the mobile communication device 202. As another example, the controller 220 may receive a data value that indicates a battery power level of the mobile communication device 202 as the monitored operating condition 289 from the battery power level sensor 226. The monitored operating condition 290 from the network bandwidth sensor 228 may be a data value that indicates network bandwidth available to the mobile communication device 202. For example, the network bandwidth sensor 228 may be configured to monitor the wireless transceiver 244 for an operating condition 261 that indicates network bandwidth available to the mobile communication device 202.

The controller 220 may be configured to determine whether to interrupt a component of the mobile communication device 202 based on one or more of the monitored operating conditions 288-290. The controller may determine that power consumption of the mobile communication device 202 may be reduced by interrupting a particular component when a monitored operating condition exceeds a threshold or is outside of a predetermined range. For example, the controller 220 may determine whether to interrupt a particular component based on a first threshold 205 corresponding to a battery power level and a second threshold 207 corresponding to network bandwidth available to the mobile communication device 202.

In a particular embodiment, the controller 220 is configured to interrupt one or more components of the mobile communication device 202 via a control signal. For example, the controller 220 may reduce power consumption at the data source access circuitry 208 by transmitting an interrupt via a first control signal 283. As another example, the controller 220 may generate a second control signal 284 to interrupt the security circuitry 212, a third control signal 285 to interrupt the decompression and decoding circuitry 214, a fourth control signal 287 to interrupt the post decoding processing circuitry 216, and a fifth control signal 286 to interrupt the rendition device 218.

In a particular embodiment, the mobile communication device 202 includes a memory 267 that includes a computer readable medium that stores instructions (e.g., software 265) that are executable by a processor, such as the controller 220. For example, the software 265 may include instructions that are executable by a computer (e.g., the mobile communication device 202) to detect the mute command 295 at the mobile communication device 202 while the mobile communication device 202 is performing audio content processing. The software 265 may also include instructions that are executable by the computer to monitor the operating condition (e.g., the monitored operating condition 288-290) of the mobile communication device 202 in response to receiving the mute command 295. The software 265 may also include instructions that are executable by the computer to determine whether to interrupt a component used to perform the audio content processing, such as one or more of the components 240-266, based on the monitored operating condition 288-290.

During operation, the mobile communication device 202 processes audio data for playback via the transmitter 264, the headphone interface 230, or the speaker 232. For example, audio data is received via one or more sources 204, 206, 209,

210 by the data source access circuitry 208 and is processed by one or more components of the mobile communication device 202, such as the security circuitry 212, the decompression and decoding circuitry 214, and the post decoding processing circuitry 216, for transmission via the rendition device 218. The controller 220 may receive the mute command 295 during processing and playing of the audio data. In response to receipt of the mute command 295, the controller 220 may monitor one or more monitored operating conditions 288-290 from the temperature sensor 224, the battery power level sensor 226, and the network bandwidth sensor 228.

Based on the monitored operating conditions 288-290, the controller 220 may determine whether to interrupt one or more components of the mobile communication device 202. For example, when the monitored operating condition 288 indicates that a temperature of the mobile communication device 202 is outside an acceptable operating range, the controller 220 may send an interrupt signal via one of the control signals 283-287 to one or more of the components of the mobile communication device 202. As another example, in response to the monitored operating condition 290 indicating that network bandwidth available 261 to the mobile communication device 202 is below a threshold, the controller 220 may send one or more interrupt signals via the control signals 283-287. The controller 220 may also send one or more control signals 283-287 to interrupt a particular component of the mobile communication device 202 when the monitored operating condition 289 indicates that a battery power level of the mobile communication device 202 is below a threshold. Examples of selecting components to interrupt are described with respect to FIGS. 5-7.

In a particular embodiment, after transmitting the interrupt to one or more of the components, the controller 220 may keep track of the expected processing state 203 of the mobile communication device 202. The expected processing state 203 of the mobile communication device 202 may indicate which portions of data that components of the mobile communication device 202 should resume processing based on duration of time following an interrupt. For example, the rendition device 218 may be ten seconds into a song playback when an interrupt is received via the control signal 286 to the rendition device 218. In this case, twenty seconds after the interrupt, the controller 220 may determine based on the expected processing state 203 that the rendition device 218 should resume transmitting the processed audio data 280 at a portion of the processed audio data 280 corresponding to thirty seconds into the song. By tracking and storing the expected processing state 203, the controller 220, upon de-selection of the mute command 295, can re-engage the components of the mobile communication device 202 such that audio content processing reoccurs without delay and without impacting perceived audio playback performance to a user of the mobile communication device 202.

The controller 220 may send a resume signal to a component of the mobile communication device 220 via one of the control signals 283-287 to resume processing of audio data. For example, when the rendition device 218 has been interrupted, the controller 220 may send the resume signal via the control signal 286.

By interrupting components of the mobile communication device 202 based on a monitored operating condition (e.g., 288-290), the mobile communication device 202 may save power during periods when the device is in a mute state. While the mobile communication device 202 is in a mute state, the user has indicated that playback of audio content is not desired. Since the delivery of the processed audio data 280 via the speaker 232 or the headphone interface 230 would result in audio data being processed that is not delivered to the user, audio processing components may be shut off while the device is in the mute state. Thus, power to components that process the audio data may be reduced without impacting muted playback of audio content.

Figure 3:
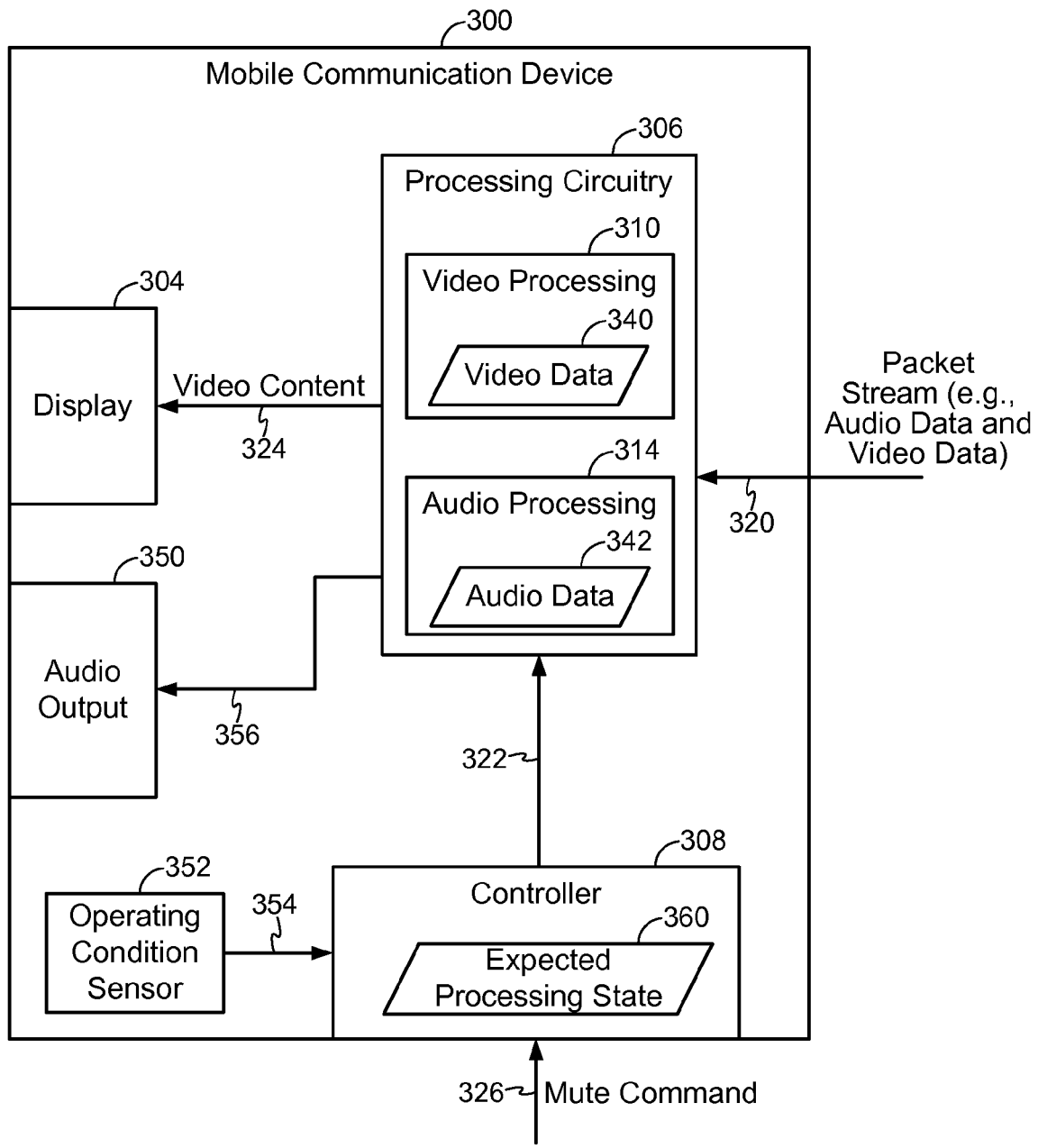
FIG. 3 is a block diagram of a second illustrative embodiment of a mobile communication device.

Referring to FIG. 3, a mobile communication device 300 is shown. The mobile communication device 300 includes a display 304, a controller 308, an operating condition sensor 352, an audio output 350, and processing circuitry 306 that includes video processing circuitry 310 and audio processing circuitry 314. The mobile communication device 300 is configured to process a packet stream 320 to deliver video content 324 to the display 304 and audio content 356 to the audio output 350. In response to receiving a mute command 326, the mobile communication device 300 may interrupt one or more of the components of the processing circuitry 306 based on a monitored operating condition 354 of the mobile communication device 300.

In a particular embodiment, the video processing circuitry 310 is configured to process video data 340 within the packet stream 320 to generate the video content 324 for display via the display 304. For example, the video content 324 may be a video signal that is used to create images on a liquid crystal display (LCD) screen. The audio processing circuitry 314 is configured to process audio data 342 within the packet stream 320 to generate the audio content 356 for playing via the audio output 350. For example, the audio processing circuitry 314 may include a component of an audio component processing pipeline, such as the data source access circuitry 208, the security circuitry 212, the decompression and decoding circuitry 214, and the post decoding processing circuitry 216 of FIG. 2. As another example, the audio output 350 may be a speaker or headphone interface for outputting the audio content 356.

In a particular embodiment, the controller 308 is configured to receive the mute command 326. For example, a user may initiate the mute command 326 by activating a button. In response to receiving the mute command 326, the controller 308 may monitor the operating condition sensor 352 for the monitored operating condition 354. The operating condition sensor 352 may be a device that indicates an operating condition of the mobile communication device 300, such as a temperature sensor, a battery power level sensor, or a network bandwidth sensor. For example, when the operating condition sensor 352 is a temperature sensor, the monitored operating condition 354 received by the controller 308 may be a detected temperature of the mobile communication device 300.

In a particular embodiment, the controller 308 is configured to determine whether to interrupt the processing circuitry 306 based on the mute command 326 and the monitored operating condition 354 received from the operating condition sensor 352. For example, when the operating condition sensor 352 is a battery power level sensor and the monitored operating condition 354 received by the controller 308 indicates that a battery power level of the mobile communication device 300 is below a threshold, the controller 308 may be configured to interrupt one or more components of the processing circuitry 306. The controller 308 may send an interrupt signal via a control signal 322 to the processing circuitry 306. For example, the controller 308 may interrupt the audio processing circuitry 314 via the control signal 322.

In a particular embodiment, the controller 308 is configured to track an expected processing state 360 of the mobile communication device 300. For example, the expected processing state 360 may indicate which portion of the packet stream 320 the processing circuitry 306 is processing at a given time after the processing circuitry 306 is interrupted. The controller 308 may be configured to send a resume signal to processing circuitry 306 in response to receiving a deactivation of the mute command 326. In a particular embodiment, the controller 308 may use the expected processing state 360 to determine which portion of the audio data 342 or the video data 340 the processing circuitry 306 would be processing if the interrupt had not occurred. The resume signal may indicate to the processing circuitry 306 which data should be processed upon reengagement.

During operation, the controller 308 may selectively shut off audio processing and delivery of audio content to the audio output 350 in response to the mute command 326 while video processing of video data 340 continues generating video content 324 for display at the display 304. For example, in response to the monitored operating condition 354 exceeding a threshold, the controller 308 may suspend decoding of the audio data 342 at the mobile communication device 300 while the mobile communication device 300 continues displaying the video content 324. As another example, the controller 308 may suspend provisioning of the audio content 356 to the audio output 350 while displaying the video content 324 in response to the monitored operating condition 354 exceeding the threshold. In this case, the threshold for the monitored operating condition 354 may be a low battery level, low network bandwidth availability, or a temperature of the mobile communication device 300 exceeding an acceptable range. By interrupting components of the mobile communication device 300 based on the monitored operating condition 354 in response to the mute command 326 and reengaging processing based on the expected processing state 360, the mobile communication device 300 may reduce power consumption during a mute condition and resume processing without impacting perceived audio playback performance to a user.

Figure 4:
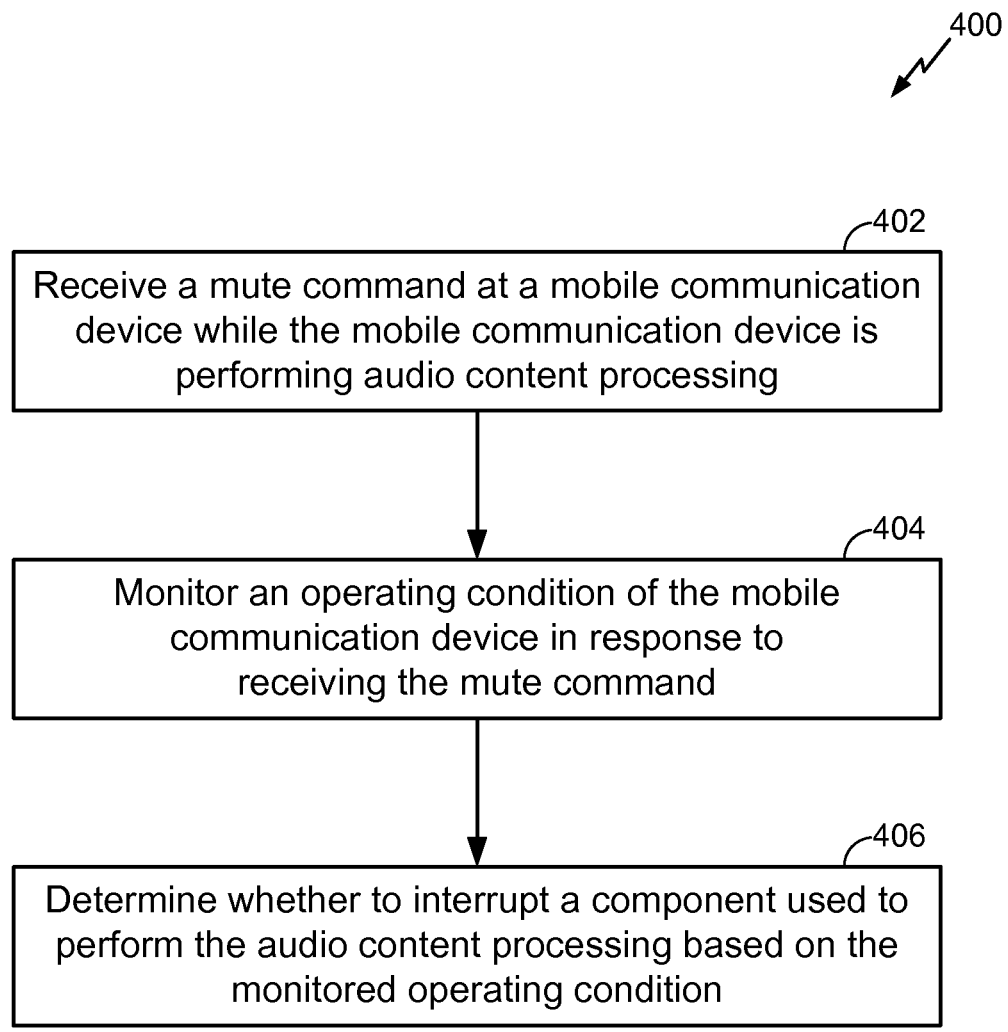
FIG. 4 is a flow chart of a particular illustrative embodiment of a method of interrupting a component of a mobile communication device based on a mute command and a monitored operating condition.

Referring to FIG. 4, a method of interrupting a component of a mobile communication device based on a mute command and a monitored operating condition is disclosed and generally designated 400. The method 400 includes receiving a mute command at a mobile communication device while the mobile communication device is performing audio content processing, at 402. For example, the mobile communication device 100 of FIG. 1 may receive the mute command 130 while the mobile communication device 100 is performing audio content processing.

The method 400 also includes monitoring an operating condition of the mobile communication device in response to receiving the mute command, at 404. For example, the mobile communication device 100 of FIG. 1 may monitor the operating condition 132 in response to receiving the mute command 130. The method 400 includes determining whether to interrupt a component used to perform the audio content processing based on the monitored operating condition, at 406. For example, the mobile communication device 100 of FIG. 1 may determine whether to interrupt a component (e.g., the first component 120, the second component 122, or the third component 124) used to perform the audio content processing based on the monitored operating condition 136. Interrupting components based on monitoring operating condition may enable the mobile communication device 100 to reduce power at components that the user is not using.

Figure 5:
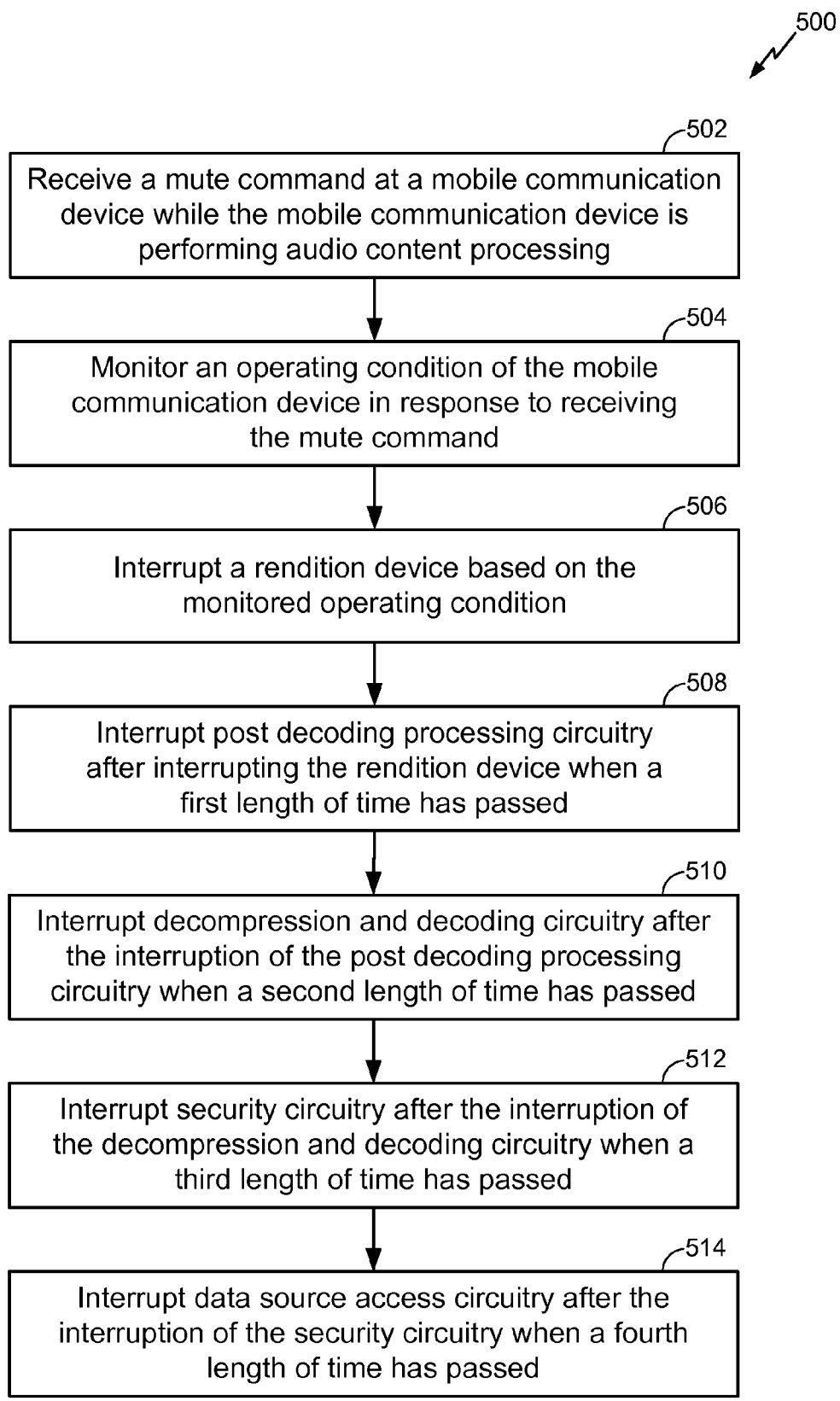
FIG. 5 is a flow chart of a second illustrative embodiment of a method of interrupting a component of a mobile communication device based on a mute command and a monitored operating condition.
Figure 6:
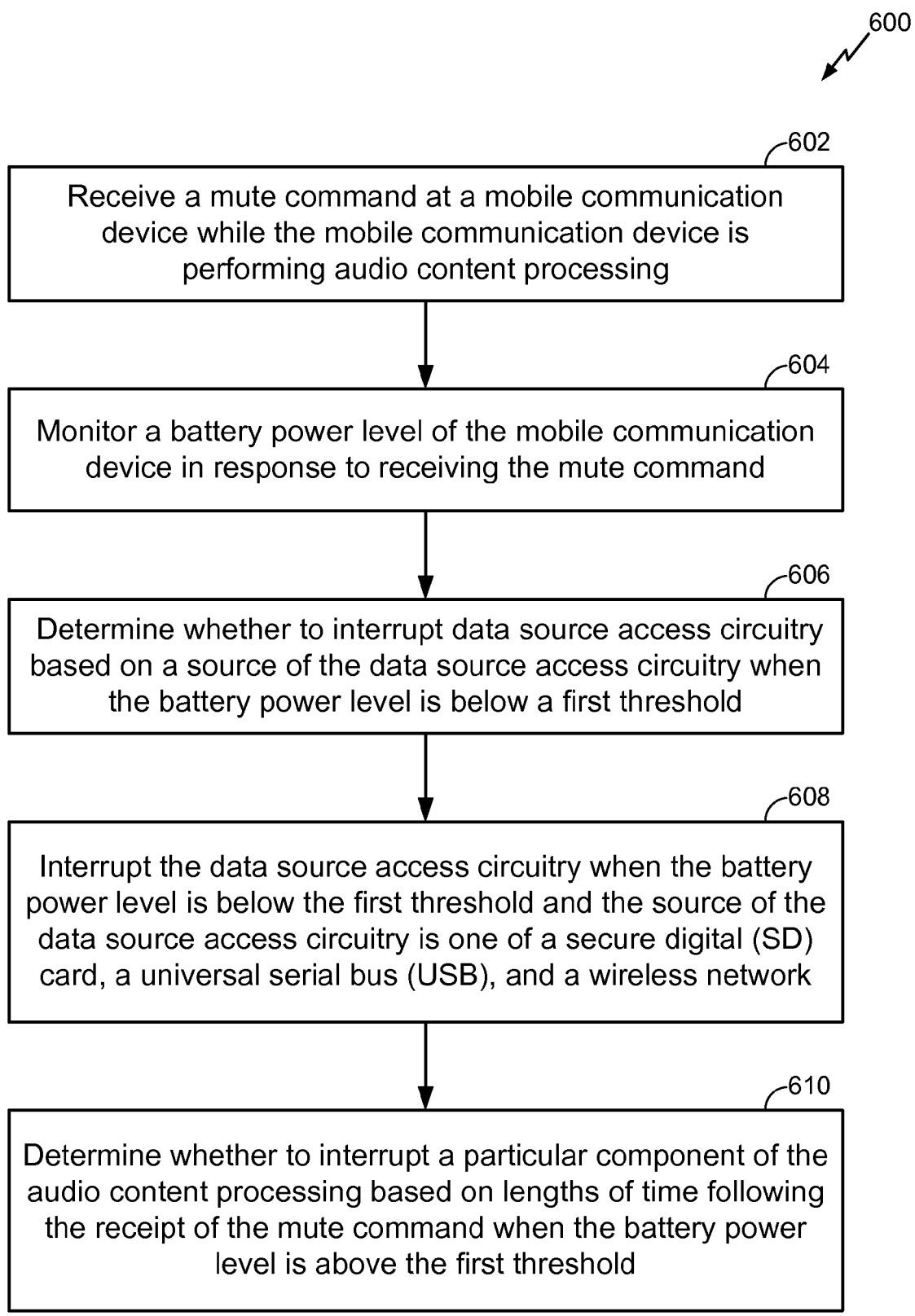
FIG. 6 is a flow chart of a third illustrative embodiment of a method of interrupting a component of a mobile communication device based on a mute command and a monitored operating condition.
Figure 7:
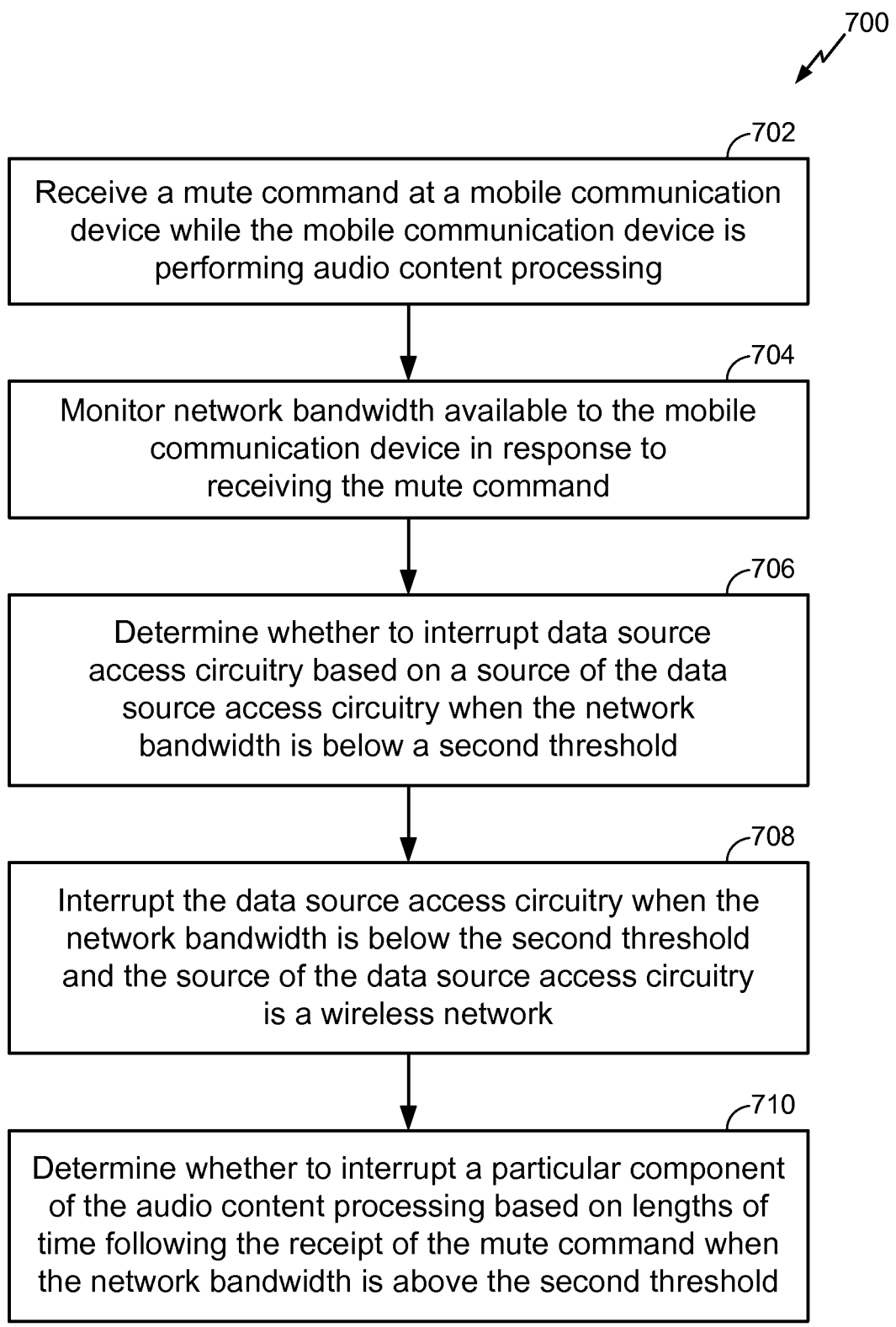
FIG. 7 is a flow chart of a fourth illustrative embodiment of a method of interrupting a component of a mobile communication device based on a mute command and a monitored operating condition.

FIGS. 5-7 illustrate examples of selecting components to interrupt based on a length of time (FIG. 5), battery power level (FIG. 6), and network bandwidth availability (FIG. 7).

Referring to FIG. 5, a method of interrupting components of a mobile communication device based on a mute command and a monitored operating condition is disclosed and generally designated 500. The method 500 includes receiving a mute command at a mobile communication device while the mobile communication device is performing audio content processing, at 502. For example, the mobile communication device 202 of FIG. 2 receives the mute command 295 while the mobile communication device 202 is performing audio content processing.

The method 500 also includes monitoring an operating condition of the mobile communication device in response to receiving the mute command, at 504. For example, the mobile communication device 202 of FIG. 2 may monitor an operating condition 288-290 of the mobile communication device 202 in response to receiving the mute command 295. The method 500 may include interrupting a rendition device based on the monitored operating condition, at 506. For example, the controller 220 of FIG. 2 may interrupt the rendition device 218 based on the monitored operating condition, 289.

While the mute condition continues, additional processing circuitry may be interrupted to conserve resources based on the duration of the mute state. Post-decoding processing circuitry may be interrupted after interrupting the rendition device when a first length of time has passed, at 508. For example, in FIG. 2, the controller 220 may interrupt the post-decoding processing circuitry 216 after interrupting the rendition device 218 when a first length of time has passed. Decompression and decoding circuitry may be interrupted after the interruption of the post-decoding processing circuitry when a second length of time has passed, at 510. For example, in FIG. 2, the controller 220 interrupts the decompression and decoding circuitry 214 after the interruption of the post-decoding processing circuitry 216 when a second length of time has passed.

The method 500 includes interrupting security circuitry after interruption of the decompression and decoding processing circuitry when a third length of time has passed, 512. For example, the controller 220 may interrupt the security circuitry 212 after the interruption of the decompression and decoding circuitry 214 when a third length of time has passed. The method 500 includes interrupting data source access circuitry after the interruption of the security circuitry when a fourth length of time has passed, at 514. For example, the controller 220 at FIG. 2 interrupts the data source access circuitry 208 after the interruption of the security circuitry 212 when a fourth length of time has passed. In a particular embodiment, the lengths of time (e.g., the first length, the second length, the third length, and the fourth length) may be measured from the receipt of a mute command or a duration of time following a prior interrupt.

Interrupting a component of a mobile communication device based on a duration of a mute condition or a duration of time following an interrupt of another component enables a gradual reduction in use of processing components based on an interest of the user. For example, the longer the duration of the mute state, the less likely the user will resume playback of the audio content. In addition, interrupting components based on a duration of time enables more components to be interrupted and thus more power savings the longer the mute state continues. Furthermore, a general order of interruption of the components may coincide with power usage at each stage and may affect delay in resuming processing when the mute condition is removed.

Referring to FIG. 6, a method of interrupting a component of a mobile communication device based on a mute command and a monitored operating condition is disclosed and generally designated 600. The method 600 includes receiving a mute command at a mobile communication device while the mobile communication device is performing audio content processing, at 602. For example, the controller 220 of FIG. 2 receives the mute command 295 at the mobile communication device 202 while the mobile communication device 202 is performing audio content processing.

The method 600 includes monitoring battery power levels of the mobile communication device in response to receiving the mute command, at 604. For example, the controller 220 of FIG. 2 monitors a battery power level 289 of the mobile communication device 202 in response to receiving the mute command 295. The method 600 also includes determining whether to interrupt data source access circuitry based on a source of the data source access circuitry when the battery power level is below a first threshold, at 606. For example, the controller 220 of FIG. 2 may determine whether to interrupt the data source access circuitry 208 when the battery power level is below the first threshold 205.

The method 600 includes interrupting the data source access circuitry when the battery power is below the first threshold and the source of the data source access circuitry is one of a Secure Digital (SD) card, and Universal Serial Buss (USB) and a wireless network, at 608. For example, the controller 220 of FIG. 2 may interrupt the data source access circuitry 208 when the battery power level is below the first threshold 205 and the source of the data source access circuitry 208 is one of the Secure Digital (SD) card 210, the USB device 206, and the wireless network 204. In contrast, when the source is an internal memory, the data source access circuitry 208 may not be interrupted because power requirements of the internal memory may be low and shutting down the internal memory may not generate a significant power savings.

Shutting down the data source access circuitry may prevent new content from being processed by other components of the mobile communication device. In this case, the interruption of the data source access circuitry shuts down all downstream processing components, such as security circuitry, decompression and decoding circuitry, post-decoding processing circuitry, and rendition devices.

The method 600 also includes determining whether to interrupt a particular component of the audio content processing based on length of time following the receipt of the mute command when the battery power level is above the first threshold, at 610. For example, the controller 220 of FIG. 2 may determine whether to interrupt a particular component (208, 212, 214, 216, and 218) of the audio content processing based on length of time following the receipt of the mute command 295 when the battery power level 289 is above the first threshold 205.

Interrupting data source access circuitry of a mobile communication device based on a battery power level of the mobile communication device enables the mobile communication device to shut down a larger number of the processing components at a time when power savings is a higher priority than processing audio content.

Referring to FIG. 7, a method of interrupting a component of a mobile communication device based on a mute command and a monitored operating condition is disclosed and generally designated 700. The method 700 includes receiving a mute command at a mobile communication device while the mobile communication device is performing audio content processing, at 702. For example, the controller 220 of FIG. 2 receives the mute command 295 at the mobile communication device 202 while the mobile communication device 202 is performing audio content processing.

The method 700 includes monitoring network bandwidth available to the mobile communication device in response to receiving a mute command, at 704. For example, the controller 220 of FIG. 2 monitors network bandwidth available to the mobile communication device 202 in response to receiving the mute command 295. The method 700 includes determining whether the interrupt data source access circuitry based on a source of the data source access circuitry when the network bandwidth is below a second threshold, at 706. For example, the controller 220 of FIG. 2 determines whether to interrupt the data source access circuitry 208 based on a source (e.g., 204, 206, 209, and 210) of the data source access circuitry 208 when the network bandwidth is below the second threshold 207.

The method 700 includes interrupting the data source access circuitry when the network bandwidth is below the second threshold and the source of the data source access circuitry is a wireless network, at 708. For example, in FIG. 2, the controller 220 interrupts the data source access circuitry 208 when the network bandwidth is below the second threshold and the source of the data source access circuitry 208 is the wireless network 204. The method 700 includes determining whether to interrupt a particular component of the audio content processing based on lengths of time following the receipt of the mute command when the network bandwidth is above a second threshold, at 710. For example, the controller 220 may determine whether to interrupt a particular component, 208, 212, 214, 216, and 218 of the audio content processing based on lengths of time following the receipt of the mute command 295, when the network bandwidth is above the second threshold 207, such as the example illustrated in FIG. 5.

Interrupting data source access circuitry of a mobile communication device based on network bandwidth availability of the mobile communication device when a source of the data source access circuitry is a wireless network enables the mobile communication device to conserve bandwidth. By reducing bandwidth usage for receiving audio content that the user is not interested in hearing (during a mute state), other components of the mobile communication device may access the available network bandwidth.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method comprising:
receiving a mute command at a mobile communication device while the mobile communication device is performing audio processing, wherein receiving the mute command results in audio output being silenced, and wherein the audio processing continues after audio output is silenced;
monitoring an operating condition of the mobile communication device in response to receiving the mute command;
determining whether to interrupt a component used to perform the audio processing based on the monitored operating condition; and
determining whether to interrupt a second component after a first length of time has passed since the component used to perform the audio processing is interrupted.

2. The method of claim 1, wherein the operating condition comprises network bandwidth available to the mobile communication device.

3. The method of claim 1, wherein the operating condition comprises a battery power level of the mobile communication device.

4. The method of claim 1, wherein the operating condition includes a temperature of the mobile communication device.

5. The method of claim 1, wherein the mute command is user initiated.

6. The method of claim 1, wherein the component is one of data source access circuitry, security circuitry, decompression and decoding circuitry, post-decoding processing circuitry, or a rendition device.

7. The method of claim 1, wherein interrupting the component includes:
blocking an incoming audio data stream to an audio decoder; and
powering down the audio decoder.

8. The method of claim 1, further comprising maintaining an elapsed time while the component is interrupted to enable re-synchronization of an audio data stream in response to the mute command being de-activated.

9. The method of claim 1, further comprising receiving a packet stream including audio data and video data.

10. The method of claim 9, further comprising in response to the operating condition exceeding a threshold, displaying video content corresponding to the video data while suspending decoding of audio data at the mobile communication device.

11. The method of claim 9, further comprising in response to the operating condition exceeding a threshold, displaying video content corresponding to the video data while suspending provision of the audio data to a speaker at the mobile communication device.

12. The method of claim 1, further comprising determining whether to interrupt data source access circuitry based on a source of the data source access circuitry when a battery power level is below a first threshold.

13. The method of claim 12, further comprising interrupting the data source access circuitry when the battery power level is below the first threshold and the source of the data source access circuitry is one of a secure digital (SD) card, a universal serial bus (USB), and a network connection.

14. The method of claim 1, further comprising determining whether to interrupt data source access circuitry based on a source of the data source access circuitry when network bandwidth is below a second threshold.

15. The method of claim 14, further comprising interrupting the data source access circuitry when the network bandwidth is below the second threshold and the source of the data source access circuitry is a wireless network.

16. An apparatus, comprising:
a media processing system including at least one processing component; and
a controller, the controller comprising:
a first input to receive a mute command, wherein receiving the mute command results in audio output being silenced by the at least one processing component, and wherein the at least one processing component continues processing after the audio output is silenced;
a second input to receive an operating condition;
an output to provide a control signal to selectively change a power consumption condition of the at least one processing component; and
an additional output to provide a control signal to selectively change an additional power consumption condition of an additional processing component after a first length of time has passed since the power consumption condition of the at least one processing component is changed.

17. The apparatus of claim 16, wherein the at least one processing component is one of data source access circuitry, security circuitry, decompression and decoding circuitry, post-decoding processing circuitry, or a rendition device and wherein selectively changing the power level consumption condition includes transitioning to a low power state.

18. The apparatus of claim 16, wherein the at least one processing component is a rendition device, and wherein the controller is configured to interrupt post decoding processing circuitry after interrupting the rendition device when the first length of time has passed.

19. The apparatus of claim 18, wherein the controller is further configured to interrupt decompression and decoding circuitry after the interruption of the rendition device when a second length of time has passed.

20. The apparatus of claim 17, wherein the controller is configured to interrupt security circuitry after the interruption of the decompression and decoding circuitry when a third length of time has passed.

21. The apparatus of claim 20, wherein the controller is further configured to interrupt data source access circuitry after the interruption of the security circuitry when a fourth length of time has passed.

22. The apparatus of claim 16, wherein the mute command is received in response to an input at a user interface.

23. An apparatus comprising:
means for receiving a mute command at a mobile communication device while the mobile communication device is performing audio content processing, wherein receiving the mute command results in audio output being silenced, and wherein the audio content processing continues after the audio output is silenced;
means for monitoring an operating condition of the mobile communication device in response to receiving the mute command;
means for determining whether to interrupt a component used to perform the audio content processing based on the monitored operating condition; and
means for determining whether to interrupt a second component after a first length of time has passed since the component used to perform the audio content processing is interrupted.

24. The apparatus of claim 23, wherein the apparatus is integrated into a mobile communication device.

25. A non-transitory computer readable medium storing instructions executed by a computer, the instructions comprising:
- instructions that are executable by the computer to detect a mute command at a mobile communication device while the mobile communication device is performing audio content processing, wherein detecting the mute command results in audio output being silenced, and wherein the audio content processing continues after the audio output is silenced;
- instructions that are executable by the computer to monitor an operating condition of the mobile communication device in response to receiving the mute command;
- instructions that are executable by the computer to determine whether to interrupt a component used to perform the audio content processing based on the monitored operating condition; and
- instructions that are executable by the computer to determine whether to interrupt a second component after a first length of time has passed since the component used to perform the audio content processing is interrupted.

26. The computer readable medium of claim 25, wherein the computer is integrated into a mobile communication device.

* * * * *